United States Patent
Katta et al.

(10) Patent No.: US 12,265,304 B1
(45) Date of Patent: Apr. 1, 2025

(54) DISPLAY DEVICE WITH INFUSED COLOR INFORMATION IN MONOCHROMATIC VISUAL INFORMATION USING SPATIALLY ADDRESSABLE BACKLIGHT GENERATOR

(71) Applicant: Daylight Computer Co., Fremont, CA (US)

(72) Inventors: Anjan Katta, San Francisco, CA (US); Ibrahim Iskender Kushan, Los Angeles, CA (US)

(73) Assignee: Daylight Computer Co., Fremont, CA (US)

( * ) Notice: Subject to any disclaimer, the term of this patent is extended or adjusted under 35 U.S.C. 154(b) by 0 days.

(21) Appl. No.: 18/584,639

(22) Filed: Feb. 22, 2024

(51) Int. Cl.
G02F 1/13357 (2006.01)
(52) U.S. Cl.
CPC .. G02F 1/133621 (2013.01); G02F 1/133603 (2013.01); G02F 2203/02 (2013.01)
(58) Field of Classification Search
CPC ......... G02F 1/133621; G02F 1/133603; G02F 2203/02
See application file for complete search history.

(56) References Cited

U.S. PATENT DOCUMENTS

| | | | | |
|---|---|---|---|---|
| 2006/0097978 A1* | 5/2006 | Ng | ....................... | G09G 3/3413 345/207 |
| 2013/0278900 A1* | 10/2013 | Hertel | .................... | G03B 21/10 353/121 |
| 2014/0055037 A1 | 2/2014 | Kurita | | |
| 2015/0131141 A1 | 5/2015 | Nakahara | | |
| 2017/0338624 A1 | 11/2017 | Takiguchi | | |
| 2021/0003852 A1* | 1/2021 | Kim | ................... | G02B 27/0103 |
| 2021/0215857 A1 | 7/2021 | Nichol | | |

OTHER PUBLICATIONS

Fukushima, Hiroki, et al. 'Diffuse Reflected Light Control for Reflective Tablet Display by Combining Use of Anisotropic and Isotropic Light-Diffusing Films'. Digest of Technical Papers—SID International Symposium, vol. 54, No. 1, 2023, pp. 841-844, https://doi.org10.1002/sdtp.16695.

Itoh, Yasuhisa, et al. 'Influence of Rough Surface upon Optical Characteristics of Reflective LCD with a Polarizer'. SID Symposium Digest of Technical Papers, vol. 29, 05 1998, (4 pages) https://doi.org10.1889/1.1833733.

* cited by examiner

*Primary Examiner* — Mariam Qureshi
(74) *Attorney, Agent, or Firm* — Esplin & Associates, PC

(57) ABSTRACT

Some implementations related to a display device that includes a display surface and a monochromatic image generator. The generator may be designed to produce monochromatic visual information for display, incorporating a primary light source and a transflective spatial light modulator. The display device may include a spatially addressable backlight generator configured to backlight the transflective spatial light modulator. This generator may include an array of colored light sources, which are driven to selectively emit light towards a non-reflective side of the modulator, infusing colored light into the monochromatic visual information. This may result in infused color information being presented at the display surface with the monochromatic visual information. The display device may include one or more processors configured to effectuate the presentation of the infused color information.

20 Claims, 5 Drawing Sheets

Lorem ipsum dolor sit amet, consectetur adipiscing elit, sed do eiusmod tempor incididunt ut labore et dolore magna aliqua. Risus at ultrices mi tempus imperdiet nulla malesuada pellentesque. Nisl pretium fusce id velit ut. Tellus mauris a diam maecenas sed enim ut sem.

Quis viverra nibh cras pulvinar mattis nunc sed. Fermentum et sollicitudin ac orci phasellus egestas tellus rutrum. Diam donec adipiscing tristique risus nec feugiat in fermentum posuere. Arcu vitae elementum curabitur vitae nunc sed velit dignissim. Enim blandit volutpat maecenas volutpat blandit aliquam etiam erat. Vitae proin sagittis nisl rhoncus mattis rhoncus urna neque. Sed egestas egestas fringilla phasellus. Donec ultrices tincidunt arcu non sodales neque. Orci porta non pulvinar neque laoreet suspendisse. Neque convallis a cras semper auctor neque vitae tempus quam. Mauris rhoncus aenean vel elit scelerisque mauris pellentesque. Orci nulla pellentesque dignissim enim sit amet. Montes nascetur ridiculus mus mauris vitae ultricies leo integer. Leo in vitae turpis massa sed. In est ante in nibh mauris cursus.

FIG. 2

DISPLAY DEVICE WITH INFUSED COLOR INFORMATION IN MONOCHROMATIC VISUAL INFORMATION USING SPATIALLY ADDRESSABLE BACKLIGHT GENERATOR

FIELD OF THE DISCLOSURE

The present disclosure generally relates to display technology, and more particularly to the integration of grayscale content with infused color in transflective systems.

BACKGROUND

In the field of display technology, a variety of display devices exist, each with their unique characteristics. Liquid crystal displays (LCDs) and organic light-emitting diode (OLED) displays are known for their ability to display a wide spectrum of colors, providing vibrant and dynamic visuals. On the other hand, reflective displays operate by reflecting ambient light to create an image. These displays are recognized for their power efficiency and their ease of visibility under bright light conditions. However, reflective displays have traditionally been limited to monochromatic or black and white images. The evolution of display technology has seen attempts to combine the benefits of these different types of displays to create a more versatile and efficient display device.

SUMMARY

The subject disclosure provides for display device with infused color information in monochromatic visual information using spatially addressable backlight generator in a system that employs a transflective spatial light modulator. Existing display technologies have several limitations. For example, while color displays like LCDs and OLEDs offer vibrant and dynamic visuals, they may consume a lot of power and can be hard to view in bright light conditions. On the other hand, reflective displays may be power-efficient and easy to view in bright light, but they are typically limited to monochromatic images. This limitation may restrict the use of reflective displays in applications where color information is important.

Implementations described herein address the aforementioned shortcomings and other shortcomings through a display device that includes a monochromatic image generator and a spatially addressable backlight generator. The monochromatic image generator may generate monochromatic visual information for display, while the spatially addressable backlight generator may infuse colored light into the monochromatic visual information, resulting in infused color information being presented on the display surface. This may allow the display device to present color information while maintaining the power efficiency and visibility advantages of reflective displays.

One aspect of the present disclosure relates to a display device. The display device may include a display surface, a monochromatic image generator, a spatially addressable backlight generator, and one or more processors. The monochromatic image generator may be configured to generate monochromatic visual information for display at the display surface. The monochromatic image generator may reflect light from a primary light source using a transflective spatial light modulator. The spatially addressable backlight generator may be configured to backlight the transflective spatial light modulator. The spatially addressable backlight generator may include an array of colored light sources that are driven to selectively emit light toward a non-reflective side of the transflective spatial light modulator to infuse colored light into the monochromatic visual information generated by monochromatic image generator, thereby resulting in infused color information being presented at the display surface with the monochromatic visual information. The one or more processors may be configured to determine the infused color information to present on the display surface, and control the colored light sources in the spatially addressable backlight generator to emit light toward the non-reflective side of the transflective spatial light modulator to effectuate the presentation of the infused color information.

According to some implementations, the one or more processors may be further configured to control the monochromatic image generator to generate the monochromatic visual information for display at the display surface.

According to some implementations, the one or more processors may be further configured to: obtain presentation information that defines the visual information for presentation on the display surface, wherein the presentation information defines the visual information in color; determine, from the presentation information, the monochromatic visual information for generation by the monochromatic image generator; and determine, from the presentation information, the infused color information.

According to some implementations, the monochromatic visual information displayed on the display surface may have a higher resolution than the infused color information presented on the display surface.

According to some implementations, the monochromatic image generator is capable of generating the monochromatic visual information displayed on the display surface at a resolution at least 100 times greater than a highest resolution of infused color information the spatially addressable backlight generator is capable of generating on the display surface.

According to some implementations, the color light sources may include side-mounted LEDs.

According to some implementations, the side-mounted LEDs may include LEDs that emit one of at least three different colors of light.

According to some implementations, the transflective spatial light modulator may be formed with physical passages between the non-reflective side and a reflective side through which colored light generated by the spatially addressable backlight generator pass to infuse colored light into the monochromatic visual information.

According to some implementations, the transflective spatial light modulator may include a transflective liquid crystal device.

According to some implementations, the one or more processors may be further configured such that determination of the infused color information is based on user interaction with the monochromatic visual information that is displayed at the displayed surface.

According to some implementations, the spatially addressable backlight generator may include a transmissive liquid crystal device.

Another aspect of the present disclosure relates to a method for using a display device. The method may include receiving input data. The method may include processing the input data using one or more processors of the display device to determine monochromatic visual information and infused color information. The method may include controlling a monochromatic image generator of the display device to generate the monochromatic visual information for display at a display surface of the display device. The method may include controlling a spatially addressable backlight generator of the display device to backlight a transflective spatial light modulator of the monochromatic image generator. The spatially addressable backlight generator may include an array of colored light sources that are driven to selectively emit light toward a non-reflective side of the transflective spatial light modulator to infuse colored light into the monochromatic visual information, thereby resulting in the infused color information being presented at the display surface with the monochromatic visual information. The method may include presenting the infused color information and the monochromatic visual information on the display surface.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates an exemplary presentation on a display surface of monochromatic visual information along with infused color information, according to some implementations.

DETAILED DESCRIPTION

Figure 1:
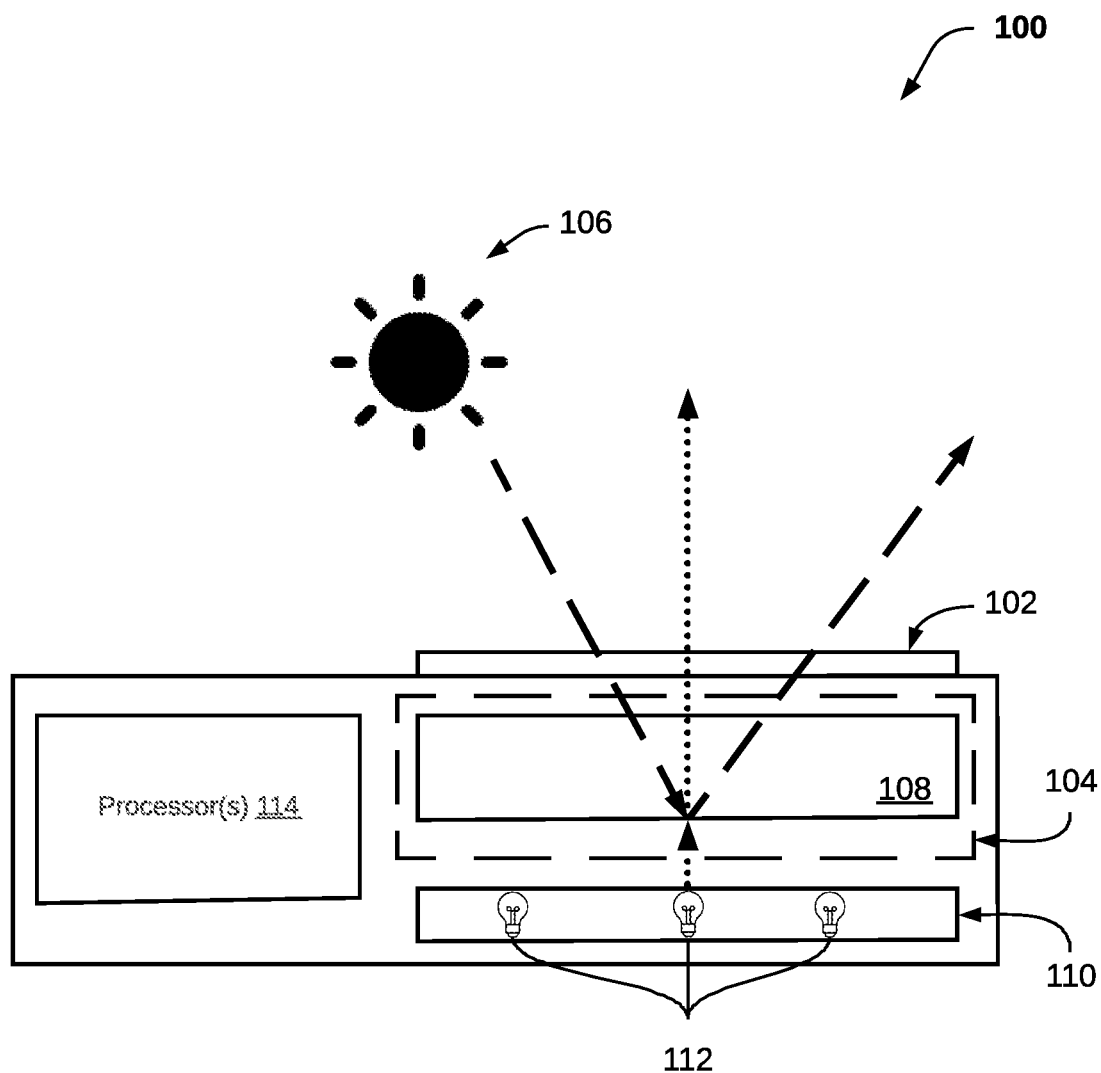
FIG. 1 is a schematic illustration of an exemplary display device, according to some implementations.

Some implementations may involve a display device that includes a display surface. This display surface may be the area where images or information are shown. It may be made of various materials and could be of any size depending on the specific implementation. This device may have a monochromatic image generator that is designed to create monochromatic visual information for display on the display surface. Monochromatic visual information refers to images or information that are displayed in one color or shades of one color. This may be particularly useful in situations where color is not necessary or could be distracting.

The monochromatic image generator may reflect light from a primary light source using a transflective spatial light modulator. The primary light source may be the main source of light for the display device. The primary light source may include ambient light and/or other sources of light. A transflective spatial light modulator is a device that can both transmit and reflect light, allowing it to control the amount and direction of light passing through it. This may be particularly useful in controlling the brightness and contrast of the displayed images.

The display device may include a spatially addressable backlight generator. This backlight generator may be designed to backlight the transflective spatial light modulator. Backlighting refers to the process of illuminating the display from behind, which may enhance the visibility of the displayed images. The backlight generator may include an array of colored light sources that can be controlled to selectively emit light towards a non-reflective side of the transflective spatial light modulator. These colored light sources may be of any type suitable for the specific implementation, such as LEDs. They may be capable of emitting light of various colors, which may be used to add color to the monochromatic images.

This may allow the device to infuse colored light into the monochromatic visual information generated by the monochromatic image generator. Infusing colored light may refer to the process of adding color to the monochromatic images by shining colored light onto them. This may be done in a controlled manner to achieve the desired visual effects. The result of this infusion of colored light may be that infused color information is presented at the display surface along with the monochromatic visual information. Infused color information refers to the colored elements that are added to the monochromatic images. This may enhance the visual appeal and information content of the displayed images.

The display device may include one or more processors. These processors may be configured to determine the infused color information to present on the display surface. The processors may be of any type suitable for the specific implementation, such as microprocessors. They may be capable of performing various tasks, including processing the visual information to be displayed. This means that the processors can control which parts of the image are colored and what colors are used. This may allow for a high degree of customization and flexibility in the display of images.

The processors may be configured to control the colored light sources in the spatially addressable backlight generator. They can direct these light sources to emit light towards the non-reflective side of the transflective spatial light modulator. This may allow the processors to control the infusion of colored light into the monochromatic visual information, thereby effectuating the presentation of the infused color information. Effectuating the presentation of the infused color information may refer to the process of making the colored elements appear on the display surface. This may involve various steps, including controlling the colored light sources and the transflective spatial light modulator.

In summary, some implementations involve a display device that can present monochromatic images with selectively colored elements. This means that the display device can show images that are primarily in one color, but with certain parts that are in different colors. This may be achieved through the use of a monochromatic image generator, a spatially addressable backlight generator with colored light sources, and one or more processors that control the generation and presentation of the infused color information. This may provide a unique and visually appealing way of displaying images or information.

FIG. 1 is a schematic illustration of an exemplary display device 100, according to some implementations. This display device 100 may be a part of a larger system, such as a computer or a mobile device. It may be designed to present visual information to a user in a clear and efficient manner. As shown in FIG. 1, the display device 100 may include one or more of a display surface 102, a monochromatic image generator 104, a primary light source 106, a transflective spatial light modulator 108, a spatially addressable backlight generator 110, an array of colored light sources 112, one or more processors 114, and/or other components. Each of these components may contribute to the overall functionality of the display device 100. They may work together to generate and present visual information to a user.

The display surface 102 may be the primary interface for the display device 100. This means that the display surface 102 may be the part of the display device 100 that a user interacts with most directly. The display surface 102 may be configured to present visual information to a user. This visual information may be generated by the other components of the display device 100. The visual information may include text, images, videos, and/or other types of content. This content may be generated by the other components of the display device 100. It may be presented in a variety of formats, including static images, moving images, and interactive content. The display surface 102 may be made of a variety of materials, including but not limited to glass, plastic, and/or other suitable materials. These materials may be chosen based on a variety of factors, including durability, cost, and visual clarity.

The monochromatic image generator 104 may be configured to generate monochromatic visual information for display at the display surface 102. Monochromatic visual information may include images or text in a single color. This color may be black, white, or any other color. The monochromatic image generator 104 may include the transflective spatial light modulator 108. The primary light source 106 may be ambient light and/or other sources of light. The transflective spatial light modulator 108 may be a device that modulates this light to create the monochromatic visual information. The light emitted toward the transflective spatial light modulator 108 from primary light source 106 may be modulated by the transflective spatial light modulator 108 to generate the monochromatic visual information. The transflective spatial light modulator 108 may selectively reflect light from a primary light source 106 back toward display surface 102 across an array of separate locations. The light received from the primary light source 106 may be of a specific color or wavelength, or may include light having a spectrum of wavelengths, as in implementations in which primary light source 106 is ambient light. The transflective spatial light modulator 108 may then modulate this light to create the monochromatic visual information.

The transflective spatial light modulator 108 may be configured to modulate the light received from the primary light source 106. Modulation may involve changing the properties of the light, such as its intensity or color. This may be done to create the monochromatic visual information. The transflective spatial light modulator 108 may include a non-reflective side and a reflective side. These sides may have different properties and may interact with the light from the primary light source 106 in different ways. The non-reflective side may be configured to receive light from the primary light source 106, while the reflective side may be configured to reflect the modulated light towards the display surface 102. The non-reflective side may absorb some of the light from the primary light source 106, while the reflective side may reflect the remaining light towards the display surface 102. This reflected light may form the monochromatic visual information that is presented to the user.

The spatially addressable backlight generator 110 may be configured to backlight the transflective spatial light modulator 108. Backlighting may involve providing light from behind the transflective spatial light modulator 108. This may enhance the visibility of the monochromatic visual information. The spatially addressable backlight generator 110 may include an array of colored light sources 112. This array may consist of multiple light sources, each of which may emit light of a different color. The array of colored light sources 112 may be driven to selectively emit light toward the non-reflective side of the transflective spatial light modulator 108. This may involve turning on specific light sources in the array based on the visual information that is to be presented. This may infuse colored light into the monochromatic visual information generated by the monochromatic image generator 104, thereby resulting in infused color information being presented at the display surface 102. The infused color information may be a combination of the monochromatic visual information and the colored light from the array of colored light sources 112. This may result in a display that is both clear and colorful.

The one or more processors 114 may be configured to determine the infused color information to present on the display surface 102. This may involve processing the visual information generated by the other components of the display device 100. The processors 114 may use algorithms or other computational methods to determine the infused color information. The one or more processors 114 may also be configured to control the colored light sources in the spatially addressable backlight generator 110 to emit light toward the non-reflective side of the transflective spatial light modulator 108. This may involve sending signals to the colored light sources to turn them on or off, or to change their color or intensity. This may effectuate the presentation of the infused color information at the display surface 102. The infused color information may be presented in a way that is clear and pleasing to the user. The presentation may be controlled to optimize the visibility and clarity of the visual information.

FIG. 2 illustrates an exemplary presentation on a display surface 200 of monochromatic visual information 202 along with infused color information 204, according to some implementations. The display surface 200 may be a part of a display device, such as a monitor, a television, a mobile device, or any other type of device capable of displaying visual information. The display surface 200 may be configured to present both monochromatic visual information 202 and infused color information 204.

The monochromatic visual information 202 may be generated by a monochromatic image generator (not shown in FIG. 2), which may include reflecting light from a primary light source using a transflective spatial light modulator. The monochromatic visual information 202 may include any type of visual information that is presented in a single color or in shades of a single color. For example, the monochromatic visual information 202 may include text, images, video, or any other type of visual content.

The infused color information 204 may be generated by a spatially addressable backlight generator (not shown in FIG. 2), which may include an array of colored light sources. The colored light sources may be driven to selectively emit light toward a non-reflective side of the transflective spatial light modulator, thereby infusing colored light into the monochromatic visual information 202.

One or more processors (not shown in FIG. 2) may be configured to determine the infused color information 204 to present on the display surface 200. The one or more processors may also be configured to control the colored light sources in the spatially addressable backlight generator to emit light toward the non-reflective side of the transflective spatial light modulator. This may effectuate the presentation of the infused color information 204 on the display surface 200 along with the monochromatic visual information 202.

In some implementations, the display surface 200 may also include other components (not shown in FIG. 2). These other components may include, for example, a touch-sensitive layer, a protective layer, a backlight layer, or any other components typically found in a display device. These other components may be configured to work in conjunction with the display surface 200, the monochromatic visual information 202, and the infused color information 204 to provide a user with a rich and immersive visual experience.

Figure 3:
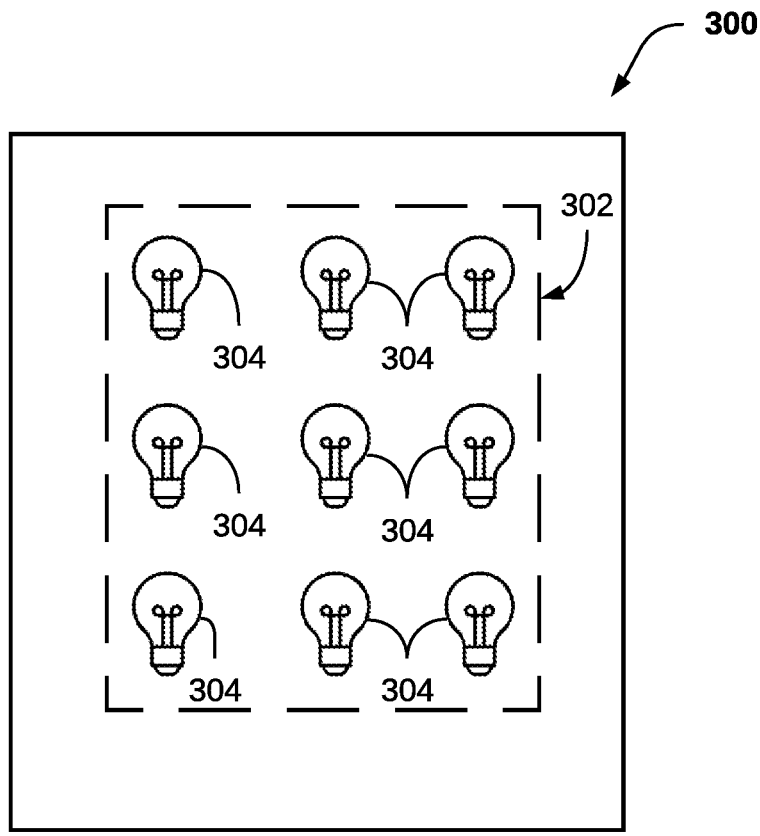
FIG. 3 illustrates an exemplary implementation of a spatially addressable backlight generator, according to some implementations.

FIG. 3 illustrates an exemplary implementation of a spatially addressable backlight generator 300, according to some implementations. The term "spatially addressable" refers to the ability of the device to control different areas independently. This independent control may allow for the creation of a backlight that varies in intensity or color across the display. As shown in FIG. 3, the spatially addressable backlight generator 300 may include an array 302 of colored light sources 304, and/or other components.

The spatially addressable backlight generator 300 may be a component of a display device. The spatially addressable backlight generator 300 may be configured to backlight a transflective spatial light modulator, which may be a part of a monochromatic image generator. The spatially addressable backlight generator 300 may include an array 302 of colored light sources 304 that are driven to selectively emit light toward a non-reflective side of the transflective spatial light modulator. This may infuse colored light into the monochromatic visual information generated by the monochromatic image generator, thereby resulting in infused color information being presented at the display surface with the monochromatic visual information.

The array 302 may be a grid-like arrangement of colored light sources 304. The array 302 may be of an arbitrary size and may be configured to provide local color to the display. The colored light sources 304 within the array 302 may be light-emitting diodes (LEDs) that are capable of emitting light of different colors. The colored light sources 304 may be driven to selectively emit light of different colors, thereby providing the capability of arbitrary color addressability.

The colored light sources 304 may be red, green, and blue (RGB) LEDs. The RGB LEDs may be capable of emitting light of different colors when driven by appropriate control signals. The RGB LEDs may be arranged in the array 302 in such a manner that they can provide local color to the display. The RGB LEDs may be driven to selectively emit light of different colors, thereby providing the capability of arbitrary color addressability.

The spatially addressable backlight generator 300 may be controlled by one or more processors. The one or more processors may be configured to determine the infused color information to present on the display surface and control the colored light sources 304 in the spatially addressable backlight generator 300 to emit light toward the non-reflective side of the transflective spatial light modulator. This may effectuate the presentation of the infused color information on the display surface.

The spatially addressable backlight generator 300, the array 302, and the colored light sources 304 may be components of a display device. The display device may be a part of a larger system, such as a computer system, a television system, a mobile device, or any other system that includes a display. The display device may be configured to present visual information, including monochromatic visual information and infused color information, on a display surface.

Figure 4:
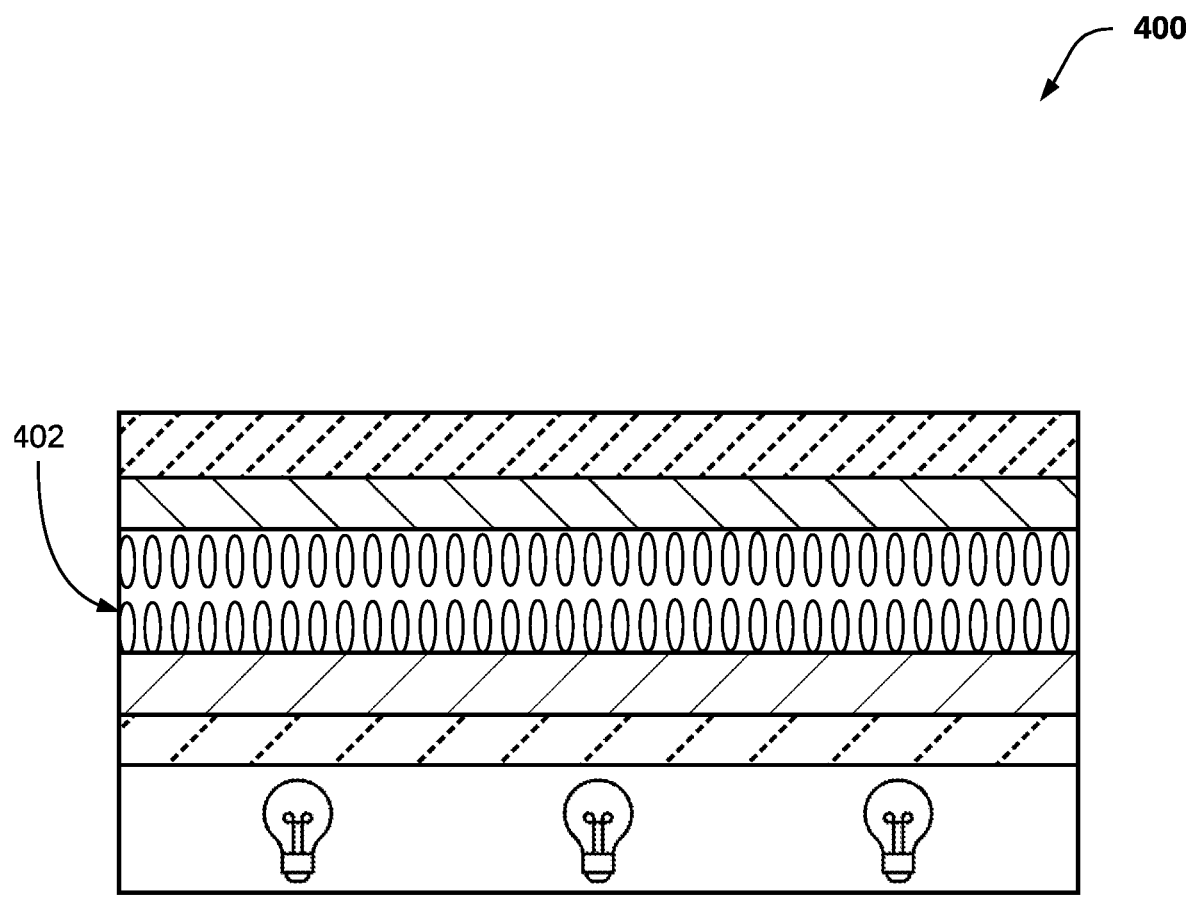
FIG. 4 illustrates an exemplary implementation of a spatially addressable backlight generator, according to some implementations.

FIG. 4 illustrates an exemplary implementation of a spatially addressable backlight generator 400, according to some implementations. As shown in FIG. 4, the spatially addressable backlight generator 400 may include a color transmissive Liquid Crystal Display (LCD) stack 402 and/or other components.

The LCD stack 402 may include multiple layers of this liquid crystal material, with each layer capable of transmitting a different color of light. The LCD stack 402 may be controlled by a processor. This processor may determine the color and intensity of light to be transmitted by each layer of the LCD stack 402. The processors also control the spatially addressable backlight generator 400 to backlight a transflective spatial light modulator, infusing colored light into the monochromatic visual information generated by a monochromatic image generator.

The spatially addressable backlight generator 400 may be part of a display device. The display device may include a display surface, a monochromatic image generator, a transflective spatial light modulator, and one or more processors. The display device may be designed to present visual information on the display surface. This visual information includes monochromatic visual information generated by the monochromatic image generator and infused color information generated by the spatially addressable backlight generator 400.

Figure 5:
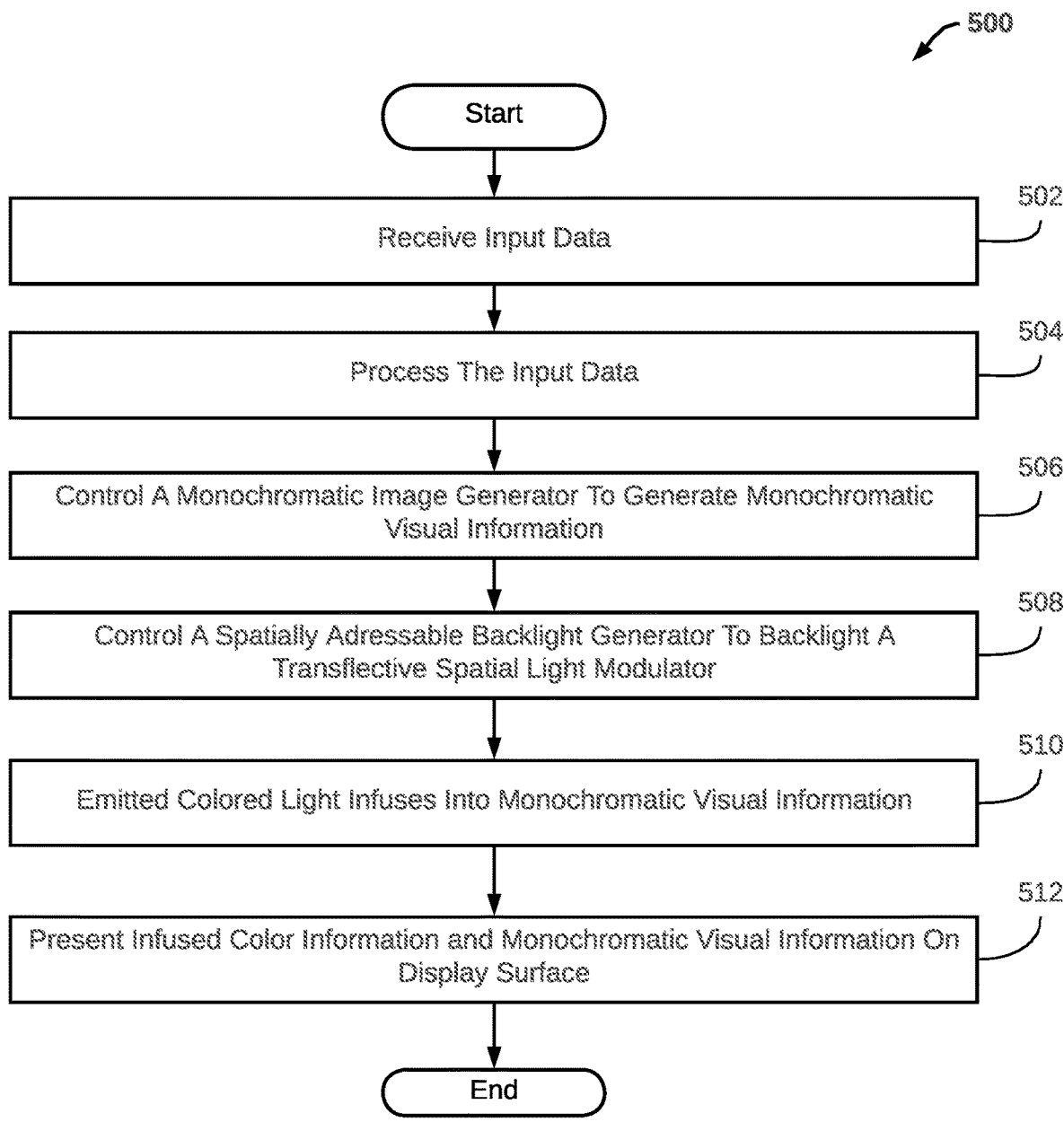
FIG. 5 illustrates an example method for using a display device, according to some implementations.

FIG. 5 illustrates an example method 500 for using a display device, according to some implementations. For explanatory purposes, the steps of the method 500 are described herein as occurring in serial, or linearly. However, multiple steps of the method 500 may occur in parallel.

At step 502, the display device may receive input data. This data could be any form of visual information that needs to be displayed on the device.

At step 504, the input data may be processed using one or more processors of the display device. The processing step may involve determining monochromatic visual information and infused color information from the input data.

At step 506, the display device may control a monochromatic image generator to generate the monochromatic visual information for display at a display surface of the device. This monochromatic image generator is responsible for creating the grayscale or black and white visual content.

At step 508, the display device may control a spatially addressable backlight generator to backlight a transflective spatial light modulator of the monochromatic image generator. The spatially addressable backlight generator may include an array of colored light sources that are driven to selectively emit light toward a non-reflective side of the transflective spatial light modulator.

At step 510, the emitted colored light may infuse into the monochromatic visual information, thereby resulting in the infused color information being presented at the display surface with the monochromatic visual information.

At step 512, the infused color information and the monochromatic visual information may be presented on the display surface. This may result in a display that maintains the high reflectivity of a monochromatic display while still providing some color information.

In some implementations, a display system that uses a color reflective LCD instead of a black and white one may be used. This may achieve the same result of generating color at a different resolution from the display resolution.

In other implementations, a display system that uses a different type of light source, such as OLEDs or quantum dots, instead of LEDs may be utilized. These technologies also have color addressability capabilities and may be used to create local color.

Some implementations may be achieved in a different environment, such as in a digital signage or advertising display. In this environment, the display system may be used to highlight specific parts of an advertisement or message.

Some implementations may be applied to a different problem, such as improving the readability of text on a display in low light conditions. The system's ability to generate color at a different resolution from the display resolution may be used to highlight important information, making it easier to read.

In some implementations, the system may be achieved using a different method, such as by using software algorithms to adjust the color and resolution of the display. This may potentially offer more flexibility and customization options for the user.

Another technology that may be used in some implementations is e-ink or electronic paper display technology. This technology may be combined with a grid of LEDs to create a display system that can generate color at a different resolution from the display resolution.

In some implementations, the system may be applied to the problem of reducing eye strain. By generating color at a different resolution from the display resolution, the display system may potentially make the display easier on the eyes, reducing eye strain for users.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A display device, the device comprising:
   a display surface;
   a monochromatic image generator configured to generate monochromatic visual information for display at the display surface, wherein the monochromatic image generator reflects light from a primary light source using a transflective spatial light modulator;
   a spatially addressable backlight generator configured to backlight the transflective spatial light modulator, wherein the spatially addressable backlight generator includes an array of colored light sources that are driven to selectively emit light toward a non-reflective side of the transflective spatial light modulator to infuse colored light into the monochromatic visual information generated by monochromatic image generator, thereby resulting in infused color information being presented at the display surface with the monochromatic visual information; and
   one or more processors configured to:
      determine the infused color information to present on the display surface, and
      control the colored light sources in the spatially addressable backlight generator to emit light toward the non-reflective side of the transflective spatial light modulator to effectuate the presentation of the infused color information.

2. The display device of claim 1, wherein the one or more processors are further configured to control the monochromatic image generator to generate the monochromatic visual information for display at the display surface.

3. The display device of claim 2, wherein the one or more processors are further configured to:
   obtain presentation information that defines the visual information for presentation on the display surface, wherein the presentation information defines the visual information in color;
   determine, from the presentation information, the monochromatic visual information for generation by the monochromatic image generator; and
   determine, from the presentation information, the infused color information.

4. The display device of claim 1, wherein the monochromatic visual information displayed on the display surface has a higher resolution than the infused color information presented on the display surface.

5. The display device of claim 1, wherein the monochromatic image generator is capable of generating the monochromatic visual information displayed on the display surface at a resolution at least 100 times greater than a highest resolution of infused color information the spatially addressable backlight generator is capable of generating on the display surface.

6. The display device of claim 1, wherein the color light sources include side-mounted LEDs.

7. The display device of claim 6, wherein the side-mounted LEDs include LEDs that emit one of at least three different colors of light.

8. The display device of claim 1, wherein the transflective spatial light modulator is formed with physical passages between the non-reflective side and a reflective side through which colored light generated by the spatially addressable backlight generator pass to infuse colored light into the monochromatic visual information.

9. The display device of claim 1, wherein the transflective spatial light modulator includes a transflective liquid crystal device.

10. The display device of claim 1, wherein the wherein the one or more processors are further configured such that determination of the infused color information is based on user interaction with the monochromatic visual information that is displayed at the displayed surface.

11. The display device of claim 1, wherein the spatially addressable backlight generator includes a transmissive liquid crystal device.

12. A method of using a display device, the method comprising:
   receiving input data;
   processing the input data using one or more processors of the display device to determine monochromatic visual information and infused color information;
   controlling a monochromatic image generator of the display device to generate the monochromatic visual information for display at a display surface of the display device;
   controlling a spatially addressable backlight generator of the display device to backlight a transflective spatial light modulator of the monochromatic image generator, wherein the spatially addressable backlight generator includes an array of colored light sources that are driven to selectively emit light toward a non-reflective side of the transflective spatial light modulator to infuse colored light into the monochromatic visual information, thereby resulting in the infused color information being presented at the display surface with the monochromatic visual information; and presenting the infused color information and the monochromatic visual information on the display surface.

13. The method of claim 12, wherein the processing of the input data includes controlling the monochromatic image generator to generate the monochromatic visual information for display at the display surface.

14. The method of claim 13, further comprising: obtaining presentation information that defines the visual information for presentation on the display surface, wherein the presentation information defines the visual information in color; determining, from the presentation information, the monochromatic visual information for generation by the monochromatic image generator; and determining, from the presentation information, the infused color information.

15. The method of claim 12, wherein the monochromatic visual information displayed on the display surface has a higher resolution than the infused color information presented on the display surface.

16. The method of claim 12, wherein the monochromatic image generator is capable of generating the monochromatic visual information displayed on the display surface at a resolution at least 100 times greater than a highest resolution of infused color information the spatially addressable backlight generator is capable of generating on the display surface.

17. The method of claim 12, wherein the controlling of the spatially addressable backlight generator includes controlling side-mounted LEDs.

18. The method of claim 17, wherein the side-mounted LEDs include LEDs that emit one of at least three different colors of light.

19. The method of claim 12, wherein the transflective spatial light modulator is formed with physical passages between the non-reflective side and a reflective side through which colored light generated by the spatially addressable backlight generator pass to infuse colored light into the monochromatic visual information.

20. The method of claim 12, wherein the transflective spatial light modulator includes a transflective liquid crystal device, wherein the determination of the infused color information is based on user interaction with the monochromatic visual information that is displayed at the displayed surface, and wherein the spatially addressable backlight generator includes a transmissive liquid crystal device.

* * * * *